United States Patent [19]

Shafik et al.

[11] Patent Number: 5,987,727
[45] Date of Patent: Nov. 23, 1999

[54] PROCESS FOR THE PRODUCTION OF AUTOMOBILE BODY PARTS AND AUTOMOBILE BODIES

[75] Inventors: Ahmed Shafik, Wuppertal; Pamela Fritz, Erkrath; Silke Hanske, Wuppertal, all of Germany

[73] Assignee: Herberts GmbH, Wuppertal, Germany

[21] Appl. No.: 09/155,438

[22] PCT Filed: Mar. 21, 1997

[86] PCT No.: PCT/EP97/01440

§ 371 Date: Sep. 29, 1998

§ 102(e) Date: Sep. 29, 1998

[87] PCT Pub. No.: WO97/36694

PCT Pub. Date: Oct. 9, 1997

[30] Foreign Application Priority Data

Mar. 30, 1996 [DE] Germany ............... 196 12 898

[51] Int. Cl.⁶ ............... B05D 7/14; C09D 175/06
[52] U.S. Cl. ............... 29/527.2; 29/469.5; 29/527.1; 29/525.01; 29/525.04; 29/525.07; 29/525.09; 29/525.12; 29/525.15; 72/46; 156/196
[58] Field of Search ............... 29/527.1, 527.2, 29/525.01, 525.04, 525.07, 525.09, 525.12, 525.15, 469.5; 72/46; 156/196

[56] References Cited

U.S. PATENT DOCUMENTS 4,103,050  7/1978  Laskin et al. ............... 427/379
4,619,825  10/1979  Yapp et al. ............... 525/438
4,720,405  1/1988  Carson et al. ............... 427/410

FOREIGN PATENT DOCUMENTS 0 438 773  7/1991  European Pat. Off. .
0 603 772  6/1994  European Pat. Off. .
WO 89/11497  11/1989  WIPO .

*Primary Examiner*—Erma Cameron
*Attorney, Agent, or Firm*—Pillsbury Madison & Sutro LLP

[57] ABSTRACT

A process for the production of automobile parts lacquered with two coats, in which two coating layers are applied on both sides of a coil of sheet metal and are each stoved, and corresponding sheet metal parts are then stamped out of the coil and shaped by the deep-drawing process. In each case by the coil coating process, a coating composition (A) which comprises, based on its solid resin composition, 55 to 80 wt. % of one or more polyester-polyols, 2 to 10 wt. % of one or more aromatic epoxy resins and, as crosslinking agents, 5 to 15 wt. % aminoplast resin and 10 to 25 wt. % blocked polyisocyanate is applied to produce the first coating layer, and a coating composition (B) which comprises, based on its solid resin composition, 60 to 80 wt. % of one or more polyester-polyols and, as crosslinking agents, 10 to 20 wt. % aminoplast resin and 10 to 20 wt. % blocked polyisocyanate is applied to produce the second coating layer, the sum of the constituents of the coating compositions in each case being 100 wt. %. A process for the production of lacquered automobile bodies, in which the lacquered and shaped sheet metal parts are joined together by gluing and/or clinching and/or screwing.

8 Claims, No Drawings

PROCESS FOR THE PRODUCTION OF AUTOMOBILE BODY PARTS AND AUTOMOBILE BODIES

This application is the national phase of international application PCT/EP97/01440 filed Mar. 21, 1997 which designated the U.S.

FIELD OF THE INVENTION

The invention relates to a process for the production of automobile parts lacquered with two coats, in which two coating layers are applied on both sides of a coil of sheet metal and are each stoved, and corresponding sheet metal parts are then stamped out of the coil and shaped by the deep-drawing process, which is characterized in that, in each case by the coil coating process, a coating composition (A) which comprises, based on its solid resin composition, 55 to 80 wt. % of one or more polyester-polyols, 2 to 10 wt. % of one or more aromatic epoxy resins and, as crosslinking agents, 5 to 15 wt. % aminoplast resin and 10 to 25 wt. % blocked polyisocyanate is applied to produce the first coating layer, and a coating composition (B) which comprises, based on its solid resin composition, 60 to 80 wt. % of one or more polyester-polyols and, as crosslinking agents, 10 to 20 wt. % aminoplast resin and 10 to 20 wt. % blocked polyisocyanate is applied to produce the second coating layer, the sum of the constituents of the coating compositions in each case giving 100 wt. %, and to a process for the production of automobile bodies.

BACKGROUND OF THE INVENTION

Prior art in the lacquering of motor vehicles or parts thereof is initially the production of the body or the body parts. For this, correspondingly shaped sheet metal parts are first stamped out and shaped by the deep-drawing process using drawing lubricant or oil, and are then in general assembled by welding and subsequently subjected to expensive cleaning. A lacquer coat is then applied by electro-diplacquering and, if desired, one or, in the case of automobile bodies in particular, more further coats of lacquer are applied.

There is the desire to discover a simpler production process which, in particular, avoids the cleaning steps and enables the electro-diplacquering to be replaced.

European Patent Application EP-A-0 603 772 discloses a process for the production of vehicle parts from prelacquered sheets. The sheets, which have been prelacquered with a primer, are cut into sections, and these are deep-drawn and coated with a powder lacquer as the top lacquering. The lacquers used to produce the primer and the top lacquering are not described in more detail.

European Patent Application EP-A-0 438 773 discloses a process for the production of motor vehicle bodies in which sheets which have been precoated with a lacquering of at least two coats are deep-drawn and then assembled. An acrylate lacquer is employed as the primer and a polyurethane lacquer is employed as the top lacquer. The compositions of these lacquers is not explained in more detail.

WO 89/11497 describes a coating composition which can be applied by the coil coating process and is suitable for applying one-coat lacquerings, which can be subjected to deep-drawing, to sheet metal. After correspondingly shaped sheets have been stamped out, the parts lacquered with one coat in this way can be shaped by the deep-drawing process without the lacquer coat showing damage. The coating compositions from WO 89/11497 comprise a polyester-polyol with a controlled degree of branching and a weight-average molecular weight of 4,000 to 40,000 and a hydroxyl number of 10 to 100 mg KOH/g as the binder, which is crosslinked via free or blocked polyisocyanate.

The coatings produced by the coil coating process using the coating compositions from WO 89/11497 are in need of improvement in respect of their deep-drawing properties. This has been found in the case of coil coating application to both sides, where the coating layer applied to the later inside of the shaped part does not withstand the shaping process, which has a particularly extreme effect there. This manifests itself, for example, in the simulation of the deep-drawing operation in which a square dish with rounded corners is produced from a sheet coated on both sides by the coil coating process. The coating in the region of the corners on the inside of the dish shows cracks or even flaking, especially if sheets having a thickness in the range from 0.7 to 1.3 mm are employed, such as are usual in automobile coach construction. Furthermore, the deep-drawn one-coat lacquerings applied by the coil coating process do not adhere to the substrate if further coats of lacquer, which are usual in car series lacquering, are applied, such as, for example, a filler, base lacquer and clear lacquer coat. It has been found that the coil coating primer coat becomes detached from the metallic substrate, together with the subsequent lacquer coats, especially in the regions of severe shaping. For example, detachment of the multi-coat lacquering manifests itself in the region of the corners and edges on the outside of the square dish, often already after stoving of the filler coat.

SUMMARY OF THE INVENTION

There was the object of providing a process for the production of lacquered automobile coaches and for the production of lacquered motor vehicle parts which overcomes the disadvantages of the prior art. It should on the one hand replace the electro-diplacquering process and avoid expensive cleaning, and on the other hand give lacquerings which can be subjected to deep-drawing, adhere well and show no cracks.

The object is achieved by a process of the abovementioned type, which is characterized in that, in each case by the coil coating process, a coating composition (A) which comprises, based on its solid resin composition, 55 to 80 wt. % of one or more polyester-polyols, 2 to 10 wt. % of one or more aromatic epoxy resins and, as crosslinking agents, 5 to 15 wt. % aminoplast resin and 10 to 25 wt. % blocked polyisocyanate is applied to produce the first coating layer, and a coating composition (B) which comprises, based on its solid resin composition, 60 to 80 wt. % of one or more polyester-polyols and, as crosslinking agents, 10 to 20 wt. % aminoplast resin and 10 to 20 wt. % blocked polyisocyanate is applied to produce the second coating layer, the sum of the constituents of the coating compositions in each case giving 100 wt. %.

The invention furthermore relates to a process for the production of lacquered automobile bodies, in which two coating layers are applied on both sides of a coil of sheet metal and are each stoved, and sheet metal parts are then stamped out of the coil, shaped by the deep-drawing process and joined together to form an automobile body, which is characterized in that, in each case by the coil coating process, a coating composition (A) which comprises, based on its solid resin composition, 55 to 80 wt. % of one or more polyester-polyols, 2 to 10 wt. % of one or more aromatic epoxy resins and, as crosslinking agents, 5 to 15 wt. % aminoplast resin and 10 to 25 wt. % blocked polyisocyanate is applied to produce the first coating layer, a coating composition (B) which comprises, based on its solid resin composition, 60 to 80 wt. % of one or more polyester-polyols and, as crosslinking agents, 10 to 20 wt. % aminoplast resin and 10 to 20 wt. % blocked polyisocyanate is applied to produce the second coating layer, the sum of the constituents of the coating compositions in each case giving 100 wt. %, and the lacquered and shaped sheet metal parts are joined together by gluing and/or clinching and/or screwing.

The metal sheets are, for example, steel sheets or aluminium sheets, in particular steel sheets with a sheet thickness of 0.7 to 1.3 mm typical for vehicle body construction. The sheets can be provided with a layer of metal for corrosion protection, for example galvanized and/or pre-treated in the conventional manner, for example they can be phosphated and, optionally, also passivated.

The polyester-polyols employed in coating composition (A) are substantially free from olefinic double bonds. They have a weight-average molecular weight of 2,000 to 10,000, preferably between 3,000 and 7,000, and a hydroxyl number of 20 to 50 mg KOH/g. Their acid number is less than 5 mg KOH/g, preferably less than 3 mg KOH/g. They can be linear or branched in structure, and they can be mixtures of linear and/or branched polyester-polyols.

The polyester-polyols employed in coating composition (B) are substantially free from olefinic double bonds. They have a weight-average molecular weight of 5,000 to 25,000, preferably between 8,000 and 20,000, and a hydroxyl number of 20 to 50 mg KOH/g. Their acid number is less than 5 mg KOH/g, preferably less than 3 mg KOH/g. They can be linear or branched in structure, and they can be mixtures of linear and/or branched polyester-polyols. They are preferably polyester-diols which are linear in structure.

The aromatic epoxy resins contained in coating composition (A) are aromatic polyglycidyl ethers containing epoxide groups or, less preferably (although also possible), epoxy resin esters derived therefrom. The polyglycidyl ethers primarily originate from the reaction of polyphenols, preferably diphenols, and in particular polynuclear diphenols, with epichlorohydrin. The polyglycidyl ethers can also contain aliphatic contents. However, they are preferably based exclusively on diphenols. The ester derivatives of the polyglycidyl ethers are formed by partial or complete reaction of the epoxide groups with inorganic or organic acids, for example phosphoric acid or carboxylic acids. An only partial reaction is preferred, so that the epoxy resin esters still contain epoxide groups. Such aromatic epoxy resins are preferably employed in coating composition (A) individually or as a mixture such that their epoxide equivalent weight or that of the mixture is between 180 and 1,000. Particularly preferred examples of the aromatic epoxy resins which can be employed individually or as a mixture in coating composition (A) are the conventional commercially obtainable epoxy resins which primarily originate from the reaction of diphenylolpropane (bisphenol A) with epichlorohydrin and in which the epoxide equivalent weight or that of the mixture is between 180 and 1,000.

The aminoplast resins which are conventional crosslinking agents in the lacquer sector can be used as the aminoplast resins contained in coating compositions (A) and (B). Suitable aminoplast resins include, for example, alkylated condensates which are prepared by reaction of aminotriazines or amidotriazines with aldehydes. For their preparation, compounds which carry amino or amido groups, such as melamine, benzoguanamine, dicyandiamide, urea or N,N'-ethyleneurea, are subjected to a condensation reaction with aldehydes, in particular formaldehyde, in the presence of alcohols, such as methyl, ethyl, propyl, iso-butyl, n-butyl and hexyl alcohol, by known industrial processes. They can be partly or completely etherified condensates. The aminoplast resin can have modifications.

Such condensates are described, for example, in Ullmann "Encyclopedia of Industrial Chemistry", 5th edition, vol. A2, chapter "Amino resins", pages 115–141 (1985) and Houben-Weyl, "Methoden der Organischen Chemie [Methods of Organic Chemistry]", volume 14/2, pages 319–388 (1962).

Coating compositions (A) and (B) comprise blocked polyisocyanates. Masked isocyanates which can be used are any desired di- and/or polyisocyanates in which the isocyanate groups have been reacted with a compound which contains active hydrogen. Blocked di- and/or polyisocyanates are prepared e.g. by reacting a multifunctional isocyanate with at least a stoichiometric amount of a monofunctional compound which contains active hydrogen (Zerewitinoff reaction). Examples of polyisocyanates are aromatic, araliphatic and (cyclo)aliphatic diisocyanates, such as, for example, hexamethylene diisocyanate, trimethylhexane diisocyanate, cyclohexane 1,3- and 1,4-diisocyanate, and any desired mixtures of these isomers, methylcyclohexane diisocyanate, m- or p-tetramethylxylylene diisocyanate, isophorone diisocyanate, perhydrodiphenylmethane 2,4'- and/or 4,4'-diisocyanate, phenylene 1,3- and 1,4-diisocyanate, toluylene 2,4- and 2,6-diisocyanate and any desired mixtures of these isomers, xylylene diisocyanate, diphenylmethane 2,4'- and/or 4,4'-diisocyanate, 3,2'- and/or 3,4'-diisocyanato-4-methyldiphenylmethane, and oligomers derived from diisocyanates. Examples of such oligomers are polyisocyanates formed by di- or trimerization, and reaction products of a stoichiometric excess of diisocyanate with water, amines or polyols. Such polyisocyanates contain uretdione, isocyanurate, biuret, allophanate, urea and/or urethane groups. In addition to these low molecular weight polyisocyanates, the higher molecular weight isocyanate polymers which are known in polyurethane chemistry and are based on polyisocyanates containing no urethane groups and higher molecular weight polyhydroxy compounds can also be employed as the polyisocyanate component. Polyisocyanates derived from aliphatic diisocyanates, for example from hexamethylene diisocyanate, are preferred in the context of the present invention.

Agents which block the isocyanates contain only a single amine, amide, imide, lactam, thio, hydroxyl or CH-acid group. In general, volatile compounds with low molecular weights which contain active hydrogen are used, such as e.g. alcohols, such as n-butanol, isopropanol, tert-butanol, furfurol or 2-ethylhexanol, phenols, cresols, dialkylamino-alcohols, such as dimethylaminoethanol, oximes, such as methyl ethyl ketoxime or acetone oxime, lactams, such as epsilon-caprolactam or pyrrolid-2-one, imides such as phthalimide, hydroxyalkyl esters, hydroxamic acids and esters thereof, N-alkylamides, such as methylacetamide, imidazoles, such as 2-methylimidazole, or beta-diketones, such as acetylacetone, malonic acid dialkyl esters or acetoacetic acid alkyl esters.

Coating compositions (A) and/or (B) can comprise one or more blocked polyisocyanates. More than one type of protective group, for example those of different reactivity, can also be used for the blocking. For example, it is possible to use a mixture of two or more differently blocked polyisocyanates, or to employ a polyisocyanate which is blocked intramolecularly with two or more different protective groups.

The polyester-polyols, the aromatic epoxy resins, the aminoplast resins and the blocked polyisocyanates together give the resin solids in coating composition (A). The resin solids can be made up of other additional resins and/or crosslinking agents in small contents of up to 20 wt. %, preferably less than 10 wt. %.

The polyester-polyols, the aminoplast resins and the blocked polyisocyanates together give the resin solids in coating composition (B). The resin solids can be made up of other additional resins and/or crosslinking agents in small contents of up to 20 wt. %, preferably less than 10 wt. %.

Coating compositions (A) and (B) comprise pigments and, preferably, also fillers in a pigment plus filler/resin solids ratio of 0.4:1 to 1.3:1, preferably less than 1:1. Preferably, the pigment plus filler/resin solids ratio in coating composition (B) is greater than that in coating composition (A). Examples of pigments and fillers are conventional inorganic and/or organic coloured pigments and/or fillers, such as titanium dioxide, micronized titanium dioxide, iron oxide pigments, carbon black, silicon dioxide, barium sulfate, micronized mica, talc, kaolin, corrosion inhibitor pigments, such as e.g. zinc phosphate, azo pigments, phthalocyanine pigments, and quinacridone or pyrrolopyrrole pigments. Coating compositions (A) and (B) preferably comprise only non-coloured pigments.

Coating compositions (A) and (B) comprise conventional lacquer additives, such as e.g. defoamers, catalysts, flow control agents, light stabilizers, wetting agents, rheology controllers and lubricants.

Coating composition (B) preferably comprises lubricants, such as e.g. waxes. Examples of particularly suitable waxes are wool wax, carnauba wax, montan wax and polyolefin wax, for example polyethylene wax, and combinations of two or more of these waxes.

Coating compositions (A) and (B) have solids contents of 50 to 70 wt. %, preferably between 55 and 65 wt. %. They are lacquer systems based on organic solvents. Examples are glycol ethers, such as butoxyethanol, butoxypropanol and methoxypropanol; dialcohols, such as glycols, e.g. ethylene glycol and polyethylene glycol; ethers, e.g. dipropylene glycol dimethyl ether; glycol ether esters, such as ethylglycol acetate, butylglycol acetate, 3-methoxy-n-butyl acetate, butyldiglycol acetate and methoxypropyl acetate; esters, such as butyl acetate, isobutyl acetate, amyl acetate, dimethyl glutarate, dimethyl adipate and ethyl ethoxypropionate; ketones, such as methyl ethyl ketone, methyl isobutyl ketone, diisobutyl ketone, cyclohexanone and isophorone; aromatic hydrocarbons, such as xylene and Solvesso 100 (registered trademark) and aliphatic hydrocarbons.

Coating compositions (A) and (B) are in each case rolled on to the sheet metal by the coil coating process. Coating composition (A) is first applied in a dry layer thickness of 3 to 15 μm, preferably between 5 and 10 μm, and stoved in a convection oven heated at 300 to 370° C. for 30 to 60 seconds, maximum object temperatures (PMT, peak metal temperature) of between 200 and 250° C. being reached. Coating composition (B) is then applied in a dry layer thickness of 10 to 30 μm, preferably between 15 and 25 μm, and stoved in a convection oven heated at 320 to 380° C. for 30 to 60 seconds, maximum object temperatures (PMT) of between 220 and 260° C. being reached.

Sheet metal parts of the desired shape are now stamped out, in the conventional manner, of the metal coil provided with a two-coat lacquering on both sides and are then shaped by the deep-drawing process. This operation can be simulated in the laboratory by stamping out a circular blank and deep-drawing this to a square dish with rounded corners, for example by means of the deep-drawn dish testing machine marketed by Erichsen, Original ERICHSEN, model 224/II. In practice, lacquered automobile parts, such as e.g. automobile small parts or body parts, such as e.g. mud guards, engine bonnets, boot lids etc., on which the lacquering on both sides shows no cracks or flaking at all can be obtained. If desired, further conventional lacquer coats can be applied, for example by the spray process, or lacquered automobile coaches can be produced by the process according to the invention.

For this, the shaped parts are joined together to a coach. Examples of suitable joining techniques are gluing and/or clinching and/or screwing, gluing and/or clinching being preferred. After the joining together, one or more further coats of lacquer are then applied by the spray process. For example, a filler coat can first be applied and stoved, before a colour- and/or effect-imparting one- or two-coat top lacquering is sprayed on and stoved, or only a clear lacquer coat or a filler-free top lacquering is applied. The top lacquering can be applied as a one-coat top lacquer or, preferably, as a base lacquer/clear lacquer two-coat lacquering.

The process according to the invention allows the production of lacquered automobile parts or coaches without expensive cleaning processes, An electro-diplacquering process is omitted. The coil coating two-coat lacquering survives the exposure to the stoving processes of subsequently applied lacquer coats without damage and adheres excellently.

DETAILED DESCRIPTION OF THE PREFERRED EMBODIMENTS

EXAMPLE (production of a dish with a multi-coat lacquering):

Preparation of Coating Composition (A)

0.4 part silicon dioxide, 0.5 part carbon black, 0.1 part titanium dioxide, 1.0 part talc, 9.0 parts barium sulfate and 9.0 parts zinc phosphate are ground in a mixture of 14.0 parts of a 60 wt. % solution of a polyester-diol (hydroxyl number 25 mg KOH/g, Mw 5,000) in Solvesso 150 (mixture of aromatic hydrocarbons with a boiling range of 182 to 202° C.), 6.0 parts of a 60 wt. % solution of a polyester-polyol (hydroxyl number 35 mg KOH/g, Mw 4,000) in a 3:1 mixture of Solvesso 150 and butoxyethanol, 8.0 parts of a commercially available mixture of dicarboxylic acid dimethyl esters (21% dimethyl adipate, 56% dimethyl glutarate, 23% dimethyl succinate) and 1.7 parts Solvesso 100 (mixture of aromatic hydrocarbons with a boiling range of 155 to 185° C.). After addition of 0.8 part of a commercially available flow control agent, the mixture is completed with 1.0 part dibutyltin dilaurate, 22.5 parts of the solution of the polyester-polyol, 8.4 parts of a polyisocyanate based on hexamethylene diisocyanate and blocked with butanone oxime (75 wt. %, NCO content, blocked, approx. 11.1%), 4.4 parts of a 92 wt. % ethanolic solution of a melamine resin of the hexamethoxymethylmelamine type modified with styrene/allyl alcohol copolymer, 2.2 parts of a 75 wt. % xylene solution of a bisphenol A epoxy resin (epoxide equivalent weight 485) and 11 parts Solvesso 100.

Preparation of Coating Composition (B)

0.7 part silicon dioxide, 0.5 part carbon black, 0.2 part titanium dioxide, 1.2 parts talc and 22.5 parts barium sulfate are ground in a mixture of 17.4 parts of a 60 wt. % solution of a polyester-diol (hydroxyl number 25 mg KOH/g, Mw 10,000) in a 4:1 mixture of Solvesso 100 and methoxypropyl acetate, 2.3 parts ethyl ethoxypropionate, 1.5 parts Solvesso 150, 2.7 parts of a commercially available dispersing additive and 1.0 part of a commercially available flow control agent. After addition of 0.7 part of an amine-blocked sulfonic acid, 0.4 part wool wax and 0.8 part polyethylene wax, the mixture is completed with 1.0 part methoxypropyl acetate, 3.2 parts propylene carbonate, 7.0 parts ethyl ethoxypropionate, 8.4 parts Solvesso 150, 16.6 parts of the solution of the polyester-diol, 5.2 parts hexamethoxymethylmelamine, 1.1 parts of a bisphenol A epoxy resin (epoxide equivalent weight 185) and 5.6 parts of the blocked polyisocyanate from coating composition (A).

A galvanized and phosphated steel sheet 0.8 mm thick is coated with coating composition (A) in a dry layer thickness of 7 μm by roller application and stoved in a drying oven, heated at 345° C., for 40 seconds. During this, the steel sheet reaches a maximum PMT of 216° C. After cooling, coating composition (B) is applied in a dry layer thickness of 18 μm, also by roller application, and stoved in a drying oven, heated at 345° C., for 50 seconds. During this, the steel sheet reaches a PMT of 226° C. After cooling, circular blanks having a diameter of 8.5 cm are stamped out. The circular blanks are deep-drawn, in one case from the coated side, in the other case from the non-coated side, to a square dish of 40 mm times 40 mm with the deep-drawn dish testing machine Original ERICHSEN, model 224/II. In the case of both the internally and the externally coated dish, the coating shows no damage at all. The dishes are then coated with a commercially available filler in a dry layer thickness of 35 μm by spraying and stoved at 150° C. for 20 minutes. A base lacquer in a dry layer thickness of 18 μm and an acrylic/melamine resin clear lacquer in a dry layer thickness of 40 μm are sprayed on by the wet-in-wet process and the sheet is stoved at 130° C. for 30 minutes. The lacquering adheres excellently and also otherwise shows no damage at all.

What is claimed is:

1. A process for the production of automobile parts lacquered with two coats, in which two coating layers are applied on both sides of a coil of sheet metal and are each stoved, and corresponding sheet metal parts are then stamped out of the coil and shaped by the deep-drawing process, characterized in that, in each case by the coil coating process, a coating composition (A) which comprises, based on its solid resin composition, 55 to 80 wt. % of one or more polyester-polyols, 2 to 10 wt. % of one or more aromatic epoxy resins and, as crosslinking agents, 5 to 15 wt. % aminoplast resin and 10 to 25 wt. % blocked polyisocyanate is applied to produce the first coating layer, and a coating composition (B) which comprises, based on its solid resin composition, 60 to 80 wt. % of one or more polyester-polyols and, as crosslinking agents, 10 to 20 wt. % aminoplast resin and 10 to 20 wt. % blocked polyisocyanate is applied to produce the second coating layer, the sum of the constituents of the coating compositions in each case giving 100 wt. %.

2. A process for the production of lacquered automobile bodies, in which two coating layers are applied on both sides of a coil of sheet metal and are each stoved, and sheet metal parts are then stamped out of the coil, shaped by the deep-drawing process and joined together to form an automobile body, characterized in that, in each case by the coil coating process, a coating composition (A) which comprises, based on its solid resin composition, 55 to 80 wt. % of one or more polyester-polyols, 2 to 10 wt. % of one or more aromatic epoxy resins and, as crosslinking agents, 5 to 15 wt. % aminoplast resin and 10 to 25 wt. % blocked polyisocyanate is applied to produce the first coating layer, a coating composition (B) which comprises, based on its solid resin composition, 60 to 80 wt. % of one or more polyester-polyols and, as crosslinking agents, 10 to 20 wt. % aminoplast resin and 10 to 20 wt. % blocked polyisocyanate is applied to produce the second coating layer, the sum of the constituents of the coating compositions in each case giving 100 wt. %, and the lacquered and shaped sheet metal parts are joined together by gluing and/or clinching and/or screwing.

3. A process according to claim 1, wherein the polyester-polyols of the coating composition (A) have a weight-average molecular weight $M_w$ of 2,000 to 10,000, a hydroxyl number of 20 to 50 mg KOH/g and an acid number of less than 5 mg KOH/g.

4. A process according to claim 1, wherein the polyester-polyols of the coating composition (B) have a weight-average molecular weight $M_w$ of 5,000 to 25,000, a hydroxyl number of 20 to 50 mg KOH/g and an acid number of less than 5 mg KOH/g.

5. A process according to claim 2, wherein the polyester-polyols of the coating composition (A) have a weight-average molecular weight $M_w$ of 2,000 to 10,000, a hydroxyl number of 20 to 50 mg KOH/g and an acid number of less than 5 mg KOH/g.

6. A process according to claim 2, wherein the polyester-polyols of the coating composition (B) have a weight-average molecular weight $M_w$ of 5,000 to 25,000, a hydroxyl number of 20 to 50 mg KOH/g and an acid number of less than 5 mg KOH/g.

7. A process according to claim 3, wherein the polyester-polyols of the coating composition (B) have a weight-average molecular weight $M_w$ of 5,000 to 25,000, a hydroxyl number of 20 to 50 mg KOH/g and an acid number of less than 5 mg KOH/g.

8. A process according to claim 5, wherein the polyester-polyols of the coating composition (B) have a weight-average molecular weight $M_w$ of 5,000 to 25,000, a hydroxyl number of 20 to 50 mg KOH/g and an acid number of less than 5 mg KOH/g.

* * * * *